United States Patent
Kim et al.

(10) Patent No.: US 10,070,394 B2
(45) Date of Patent: *Sep. 4, 2018

(54) METHOD AND APPARATUS FOR TRANSMITTING INFORMATION ABOUT AVAILABLE POWER OF TERMINAL IN MOBILE COMMUNICATION SYSTEM

(71) Applicant: Samsung Electronics Co., Ltd., Gyeonggi-do (KR)

(72) Inventors: Soeng-Hun Kim, Gyeonggi-do (KR); Gert Jan Van Lieshout, Middlesex (GB); Kyeong-In Jeong, Gyeonggi-do (KR); Youn-Hyoung Heo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/290,336

(22) Filed: Oct. 11, 2016

(65) Prior Publication Data

US 2017/0034789 A1 Feb. 2, 2017

Related U.S. Application Data

(63) Continuation of application No. 14/285,206, filed on May 22, 2014, now Pat. No. 9,467,952, which is a (Continued)

(30) Foreign Application Priority Data

Jan. 11, 2008 (KR) .................. 10-2008-0003669
Jun. 25, 2008 (KR) .................. 10-2008-0060513

(51) Int. Cl.
*H04B 1/00* (2006.01)
*H04B 7/00* (2006.01)
(Continued)

(52) U.S. Cl.
CPC .......... *H04W 52/242* (2013.01); *H04L 43/16* (2013.01); *H04W 52/346* (2013.01);
(Continued)

(58) Field of Classification Search
CPC ........................ H04W 52/242; H04W 52/22
(Continued)

(56) References Cited

U.S. PATENT DOCUMENTS 6,745,044 B1 6/2004 Holtzman et al.
7,376,436 B2 5/2008 Hiramatsu
(Continued)

FOREIGN PATENT DOCUMENTS

CN 1504021 6/2004
CN 1604687 4/2005
(Continued)

OTHER PUBLICATIONS

PCT/ISA/237 Written Opinion issued in PCT/KR2009/000091 (11pp).
(Continued)

*Primary Examiner* — Tilahun B Gesesse
(74) *Attorney, Agent, or Firm* — The Farrell Law Firm, P.C.

(57) ABSTRACT

A method and apparatus are provided for transmitting power headroom information by a terminal in a mobile communication system. The method includes receiving, by the terminal, information on an allocated uplink transmission resource; determining whether a path loss has changed more than a threshold, after transmitting last power headroom information, when the terminal has the allocated transmission resource; if the path loss has changed more than the threshold when the terminal has the allocated transmission resource, determining a transmission of the power headroom information; and transmitting an uplink packet including the
(Continued)

power headroom information using the allocated uplink transmission resource.

20 Claims, 6 Drawing Sheets

Related U.S. Application Data continuation-in-part of application No. 12/812,484, filed as application No. PCT/KR2009/000091 on Jan. 8, 2009, now Pat. No. 8,768,399.

(51) Int. Cl.
  H04B 1/04   (2006.01)
  H04W 52/24  (2009.01)
  H04W 52/34  (2009.01)
  H04W 52/36  (2009.01)
  H04W 72/04  (2009.01)
  H04L 12/26  (2006.01)
  H04W 88/02  (2009.01)
  H04W 88/08  (2009.01)
  H04W 88/12  (2009.01)

(52) U.S. Cl.
  CPC ..... *H04W 52/365* (2013.01); *H04W 72/0413* (2013.01); *H04W 88/02* (2013.01); *H04W 88/08* (2013.01); *H04W 88/12* (2013.01)

(58) Field of Classification Search
  USPC ........................................ 455/522, 69, 127.1
  See application file for complete search history.

(56) References Cited

U.S. PATENT DOCUMENTS

| | | | |
|---|---|---|---|
| 7,616,596 B2 | 11/2009 | Lee et al. | |
| 8,023,897 B2* | 9/2011 | Cho | H04W 52/245 455/10 |
| 8,068,868 B2* | 11/2011 | Chen | H04W 52/545 455/127.1 |
| 8,223,708 B2* | 7/2012 | Guo | H04L 47/14 370/329 |
| 8,295,236 B2 | 10/2012 | Ishii | |
| 8,315,661 B2* | 11/2012 | Zong | H04W 52/367 455/226.1 |
| 8,335,233 B2 | 12/2012 | Ishii | |
| 8,391,219 B2 | 3/2013 | Ishii | |
| 8,432,883 B2 | 4/2013 | Ishii | |
| 8,457,676 B2* | 6/2013 | Michel | H04W 52/365 455/522 |
| 8,537,767 B2 | 9/2013 | Zhang | |
| 8,570,957 B2 | 10/2013 | Ball | |
| 8,639,259 B2 | 1/2014 | Ishii | |
| 8,768,399 B2 | 7/2014 | Kim | |
| 8,942,195 B2 | 1/2015 | Liu | |
| 9,072,064 B2 | 6/2015 | Zhang | |
| 9,173,225 B2 | 10/2015 | Liu | |
| 9,185,665 B2 | 11/2015 | Kim | |
| 9,313,743 B2 | 4/2016 | Kwon | |
| 9,457,676 B2* | 10/2016 | Abe | H02J 5/005 |
| 9,681,400 B2* | 6/2017 | Kim | H04W 52/365 |
| 9,713,105 B2* | 7/2017 | Kim | H04W 52/365 |
| 2004/0117504 A1 | 6/2004 | Pedersen et al. | |
| 2004/0223455 A1 | 11/2004 | Fong et al. | |
| 2005/0078651 A1 | 4/2005 | Lee et al. | |
| 2005/0232156 A1 | 10/2005 | Kim et al. | |
| 2006/0058054 A1 | 3/2006 | Hiramatsu | |
| 2007/0258362 A1 | 11/2007 | Lee | |
| 2009/0175187 A1* | 7/2009 | Jersenius | H04W 52/365 370/252 |
| 2009/0245191 A1 | 10/2009 | Ball | |
| 2009/0318180 A1* | 12/2009 | Yi | H04W 52/365 455/522 |
| 2010/0091725 A1 | 4/2010 | Ishii | |
| 2010/0091726 A1 | 4/2010 | Ishii | |
| 2010/0098008 A1 | 4/2010 | Ishii | |
| 2010/0099429 A1 | 4/2010 | Ishii | |
| 2010/0103899 A1 | 4/2010 | Kwak et al. | |
| 2010/0111008 A1 | 5/2010 | Ishii | |
| 2011/0171988 A1 | 7/2011 | Kim | |
| 2011/0243016 A1 | 10/2011 | Zhang | |
| 2011/0274092 A1 | 11/2011 | Liu | |
| 2011/0319112 A1* | 12/2011 | Jeong | H04W 52/146 455/509 |
| 2012/0008552 A1* | 1/2012 | Baldemair | H04W 52/146 370/328 |
| 2012/0039205 A1* | 2/2012 | Kogure | H04W 52/367 370/252 |
| 2012/0087306 A1 | 4/2012 | Kim | |
| 2012/0113818 A1 | 5/2012 | Kim | |
| 2012/0147778 A1 | 6/2012 | Ishii | |
| 2012/0147836 A1 | 6/2012 | Ishii | |
| 2013/0064131 A1 | 3/2013 | Kwon | |
| 2013/0070611 A1 | 3/2013 | Ahn | |
| 2013/0070716 A1 | 3/2013 | Kwon | |
| 2013/0315167 A1 | 11/2013 | Zhang | |
| 2014/0254527 A1 | 9/2014 | Kim | |
| 2015/0139196 A1 | 5/2015 | Liu | |
| 2015/0319703 A1 | 11/2015 | Kwon | |
| 2015/0351053 A1 | 12/2015 | Jeong | |
| 2015/0382311 A1 | 12/2015 | Kim | |
| 2015/0382312 A1 | 12/2015 | Kim | |
| 2015/0382313 A1 | 12/2015 | Kim | |
| 2016/0044611 A1 | 2/2016 | Dal | |
| 2016/0066284 A1 | 3/2016 | Kwon | |

FOREIGN PATENT DOCUMENTS

| | | |
|---|---|---|
| CN | 101296359 | 10/2008 |
| EP | 1 564 912 | 8/2005 |
| JP | 2003-324382 | 11/2003 |
| JP | 2004-208197 | 7/2004 |
| JP | 2004-521526 | 7/2004 |
| JP | 2007-124662 | 5/2007 |
| KR | 1020020044526 | 6/2002 |
| KR | 1020020069683 | 9/2002 |
| KR | 1020050081528 | 8/2005 |
| RU | 2 308 818 | 10/2007 |
| WO | WO 2004/059884 | 7/2004 |
| WO | WO 2008/155469 | 12/2008 |

OTHER PUBLICATIONS

Nokia Siemens Networks, Nokia, "Power Control Headroom Reports for EUTRAN Uplink", 3GPP TSG RAN WG1 #50bis Meeting, R1-074348, Oct. 8, 2007.
3rd Generation Partnership Project; Technical Specification Group Radio Access Network; Evolved Universal Terrestrial Radio Access (E-UTRA).
Physical Layer Procedures (Release 8), 3GPP TS 36.213 V8.1.0, Nov. 2007.
David Comstock et al., "Reverse Link High-Speed Packet Data Support in CDMA2000 1xEV-DV: Upper Layer Protocols", IEEE Communications Magazine, Apr. 1, 2005.
Catt et al.: "Way Forward on Power Control of PUSCH," 3GPP TSG-RAN WG1 #49-bis, R1-073224, Jun. 25-29, 2007.
Japanese Office Action dated Apr. 20, 2015 issued in counterpart application No. 2014-117302.
Chinese Office Action dated Jan. 18, 2016 issued in counterpart application No. 201310086927.7, 9 pages.
European Search Report dated Oct. 17, 2014 issued in counterpart application No. 09700877.5-1855.
Nokia Siemens Networks, Nokia Corporation, "Power Headroom Reporting for EUTRAN Uplink", R1-080329, 3GPP TSG RAN WG1 #51bis Meeting, Jan. 14-18, 2008.

* cited by examiner

METHOD AND APPARATUS FOR TRANSMITTING INFORMATION ABOUT AVAILABLE POWER OF TERMINAL IN MOBILE COMMUNICATION SYSTEM

PRIORITY

This application is a Continuation of U.S. patent application Ser. No. 14/285,206, which was filed in the U.S. Patent and Trademark Office on May 22, 2014, which is a Continuation of U.S. patent application Ser. No. 12/812,484, which was filed in the U.S. Patent and Trademark Office on Mar. 31, 2011, as a National Stage filing of PCT/KR2009/000091, which was filed on Jan. 8, 2009, and claims priority under 35 U.S.C. § 119 to Korean Patent Application Serial Nos. 10-2008-0003669 and 10-2008-0060513, which were filed in the Korean Intellectual Property Office on Jan. 11, 2008 and Jun. 25, 2008, respectively, the entire content of each of which is incorporated herein by reference.

BACKGROUND OF THE INVENTION

1. Field of the Invention

The present invention relates generally to a method and apparatus for transmitting information needed to allocate transmission resources to a User Equipment (UE) in a mobile communication system and, more particularly, to a method and apparatus for transmitting power headroom information of UEs in a mobile communication system.

2. Description of the Related Art

A Universal Mobile Telecommunication Service (UMTS) system is a $3^{rd}$ generation asynchronous mobile communication system that uses Wideband Code Division Multiple Access (WCDMA) based on Global System for Mobile communication (GSM) and General Packet Radio Services (GPRS), which are European mobile communication systems.

The $3^{rd}$ Generation Partnership Project (3GPP), now in charge of UMTS standardization, considers Long Term Evolution (LTE) to be the next-generation mobile communication system of the UMTS system. LTE, a technology for implementing high-speed packet-based communication at a transfer rate reaching approximately 100 Mbps, is expected to be commercialized in about 2010. To this end, several schemes have been discussed, including a scheme to reduce the number of nodes located in communication paths by simplifying the network structure, and a scheme to align wireless protocols and wireless channels, as closely as possible.

Referring to FIG. 1, Evolved Radio Access Networks (E-RANs) 110 and 112 are simplified to 2-node structures consisting of Evolved Node Bs (ENBs) 120, 122, 124, 126 and 128, and Enhanced Gateway GPRS Support Nodes (EGGSN) 130 and 132. A User Equipment (UE) 101 accesses an Internet Protocol (IP) network 114 by way of the E-RANs 110 and 112.

The ENBs 120, 122, 124, 126 and 128 correspond to the legacy Node Bs of the UMTS system, and are connected to the UE 101 by wireless channels. Compared with the legacy Node Bs, the ENBs 120, 122, 124, 126 and 128 perform more complex functions.

In the next-generation mobile communication system (hereinafter referred to as "LTE"), since all user traffic including real-time services such as Voice over IP (VoIP) is serviced through a shared channel, a device for performing scheduling by collecting status information of UEs is needed, and the ENBs 120, 122, 124, 126 and 128 are responsible for the scheduling. To implement the transfer rate of up to 100 Mbps, LTE uses Orthogonal Frequency Division Multiplexing (OFDM) as a wireless access technology in a bandwidth of up to 20 MHz. In addition, Adaptive Modulation & Coding (AMC) for determining a modulation scheme and a channel coding rate according to the channel status of the UE is applied.

An ENB ("base station") receives reports on information received from the UEs ("terminals") to perform an operation of allocating transmission resources to the terminals, i.e., to perform scheduling, and an example of such information may include Buffer Status Report (BSR) indicating information about the amount and type of data stored in the terminals, and information about power headroom of the terminals.

The BSR provides information indicating the amount of data stored in a terminal according to priority, and this information is generated and transmitted by the terminal to the base station if particular conditions are satisfied. The particular conditions may include, for example, a situation in which new data has occurred in a terminal that stores no data, and a situation in which a predetermined time has elapsed after transmission of BSR.

The power headroom information indicates the maximum available power that the terminal can use for uplink data transmission, given the current channel condition of the UE. Although the size of the power headroom information is only a few bytes, 1 Resource Block (RB) which is the minimum transmission resource unit should be used to transmit the power headroom information, in view of characteristics of the OFDM communication system. Therefore, given that a total of 25 RBs exist in a system with a 5-MHz bandwidth, it is necessary to reduce the frequency of transmission of the power headroom information by generating and transmitting the power headroom information only when absolutely necessary.

SUMMARY OF THE INVENTION

Accordingly, the present invention has been made to solve the above-mentioned problems, and the present invention provides a method and an apparatus for efficiently transmitting and receiving control information for receiving a service in a broadcast communication system.

An aspect of the present invention is to provide a power headroom information transmission method and apparatus for reducing the frequency of transmission of power headroom information of a terminal in a mobile communication system.

Another aspect of the present invention is to provide a method and apparatus to more efficiently use uplink transmission resources by reducing the frequency of transmission of power headroom information of a terminal in a mobile communication system.

In accordance with an aspect of the present invention, there is provided a method for transmitting power headroom information by a terminal in a mobile communication system. The method includes receiving, by the terminal, information on an allocated uplink transmission resource; determining whether a path loss has changed more than a threshold, after transmitting last power headroom information, when the terminal has the allocated transmission resource; if the path loss has changed more than the threshold when the terminal has the allocated transmission resource, determining a transmission of the power headroom information; and transmitting an uplink packet including the power headroom information using the allocated uplink transmission resource.

In accordance with another aspect of the present invention, there is provided a terminal apparatus for transmitting power headroom information in a mobile communication system. The terminal apparatus includes a controller configured to determine whether a path loss has changed more than a threshold, after transmitting last power headroom information, when the terminal has an allocated transmission resource, and if the path loss has changed more than the threshold when the terminal has the allocated transmission resource, determine a transmission of the power headroom information; and a transceiver configured to receive information on the allocated uplink transmission resource, and transmit an uplink packet including the power headroom information using the allocated uplink transmission resource.

In accordance with another aspect of the present invention, there is provided a method for receiving power headroom information by a base station in a mobile communication system. The method includes transmitting, by the base station, information on an allocated uplink transmission resource to a terminal; and receiving, by the base station, an uplink packet including the power headroom information from the terminal using the allocated uplink transmission resource. The uplink packet including the power headroom information is transmitted from the terminal by determining whether a path loss has changed more than a threshold, after transmitting last power headroom information, when the terminal has the allocated transmission resource; if the path loss has changed more than the threshold when the terminal has the prior allocated transmission resource, determining a transmission of the power headroom information; and transmitting the uplink packet including the power headroom information using the prior allocated uplink transmission resource.

In accordance with another aspect of the present invention, there is provided a base station apparatus for receiving power headroom information in a mobile communication system. The base station apparatus includes a transceiver configured to transmit information on an allocated uplink transmission resource to a terminal, and receive an uplink packet including the power headroom information from the terminal using the allocated uplink transmission resource; and a controller configured to allocate an uplink transmission resource to the terminal based on the received power headroom information. The uplink packet including the power headroom information is transmitted from the terminal by determining whether a path loss has changed more than a threshold after transmitting last power headroom information when the terminal has the allocated transmission resource; if the path loss is changed more than the threshold when the terminal has the prior allocated transmission resource, determining a transmission of the power headroom information; and transmitting the uplink packet including the power headroom information using the prior allocated uplink transmission resource.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF EMBODIMENTS OF THE INVENTION

Figure 1:
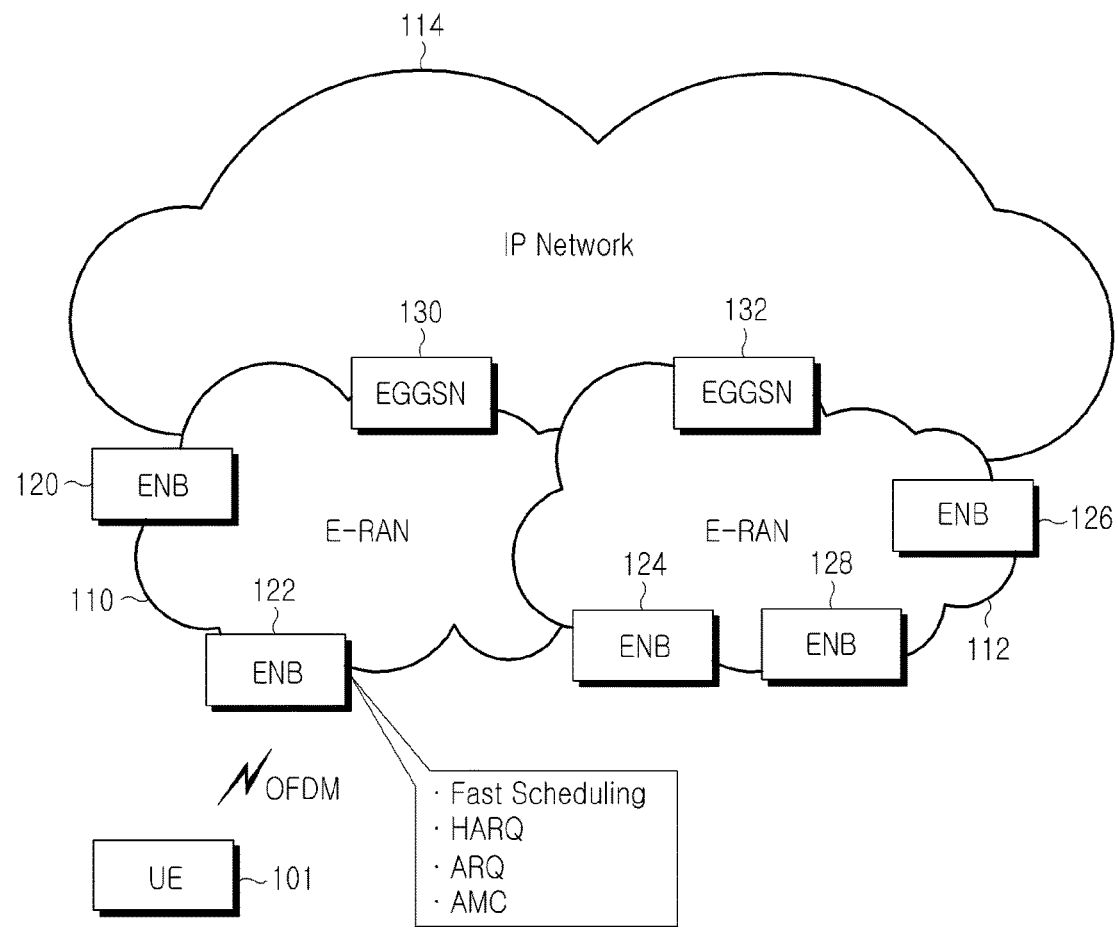
FIG. 1 provides an example of architecture of the next-generation mobile communication system based on the UMTS system.

Various embodiments of the present invention will now be described in detail with reference to the accompanying drawings. It should be noted that throughout the drawings, the same drawing reference numerals will be understood to refer to the same elements, features and structures. In the following description, specific details such as detailed configuration and components are merely provided to assist the overall understanding of certain exemplary embodiments of the present invention. In addition, descriptions of well-known functions and constructions are omitted for clarity and conciseness.

In the following description, embodiments of the present invention will be presented to accomplish the foregoing technical objectives. Although the same names of entities as those defined in $3^{rd}$ Generation Partnership Project (3GPP), which is the asynchronous mobile communication standard, or in Long Term Evolution (LTE), which is the next-generation mobile communication system currently being discussed of the UMTS system will be used for the convenience of a description of the present invention, the scope of the present invention will not be limited to such standards and names, and the invention may be applied to any systems with the similar technical background.

The necessary amount of power headroom information of terminals increases when a scheduler of a base station aggressively allocates transmission resources to the terminals. In other words, the utility of power headroom information of terminals increases when the base station intends to allocate many transmission resources to the terminals, but little power headroom information is needed when the base station allocates less transmission resources to the terminals. To describe this in more detail, a brief description is provided below of a definition of the power headroom and a method of setting uplink transmission output by a terminal during uplink data transmission.

Power headroom of a terminal is commonly calculated by Equation (1):

$$\text{Power Headroom} = 10 \log_{10}(P_{MAX}) - 10 \log_{10}(P_{tx\_lowest\_mcs}) \quad (1)$$

In Equation (1), $P_{MAX}$ is the maximum transmission output of the terminal, and $P_{tx\_lowest\_mcs}$ is the transmission output required when the terminal transmits data with one Resource Block (RS) by applying the lowest Modulation Coding Scheme (MCS) level. The $P_{MAX}$ may be determined depending on the device characteristics of the terminal or may be designated for respective terminals on an individual basis by the base station in a call setup process.

When an arbitrary MCS level is applied and data is transmitted with n number of RBs, required transmission power $P_{REQUIRED}$ is calculated by Equation (2):

$$P_{REQUIRED}=10 \log n + Po + \alpha \times PL + \text{delta\_mcs} + f(\text{delta\_}i) \quad (2)$$

In Equation (2), Po and α are positive real numbers that are stored in the terminal or signaled by the base station in a call setup process, PL is a path loss measured by the terminal, delta_mcs is an arbitrary integer that has been predetermined for each MCS level individually, and f(delta_i) is a value that the terminal obtains by inputting uplink transmission output control commands received up to now, to a specific function f( ).

The transmission output the terminal actually uses is limited by the $P_{MAX}$. Namely, the actual transmission output P of the terminal is calculated by Equation (3):

$$P = \min(P_{MAX}, P_{REQUIRED}) \quad (3)$$

Upon receiving a scheduling command to transmit data with a predetermined number of RBs at an arbitrary time by applying an arbitrary MCS level, the terminal calculates $P_{REQUIRED}$ using Equation (2). Thereafter, using Equation (3), the terminal transmits data with the $P_{REQUIRED}$ if the calculated $P_{REQUIRED}$ does not exceed the $P_{MAX}$, and the terminal transmits data with the $P_{MAX}$ if the calculated $P_{REQUIRED}$ exceeds the $P_{MAX}$. Since the $P_{REQUIRED}$ exceeding the $P_{MAX}$ indicates an impossibility of applying the required transmission output, the scheduler should allocate transmission resources and apply an MCS level to the terminal so that this situation does not occur.

The power headroom of the terminal is information that the base station references to perform scheduling such that $P_{REQUIRED}$ does not exceed $P_{MAX}$, when allocating transmission resources and applying an MCS level to the terminal.

As shown in Equation (1), since the power headroom is determined by $P_{tx\_lowest\_mcs}$, and $P_{tx\_lowest\_mcs}$ is $P_{REQUIRED}$ when applying the lowest MCS level and transmitting data with one RB, factors used for determining the power headroom include Po, α, PL and f(delta_i). Since Po and α are constants and the uplink transmission output control commands are generated by the base station, f(delta_i) is also a value know to the base station. Meanwhile, since the path loss is measured by the terminal, it is a variable unknown to the base station, and if the power headroom of the terminal changes due to the abrupt change in the path loss, the base station may not recognize the change. Therefore, if the path loss abruptly changes, the changed power headroom needs to be reported to the base station. However, even though the path loss of the terminal suddenly changes or the power headroom abruptly changes accordingly, it is inefficient to always report new power headroom to the base station.

As described above, the power headroom information of the terminal is needed when $P_{REQUIRED}$ is likely to exceed $P_{MAX}$ as the base station allocates many transmission resources and applies a high MCS level, to the terminal. However, if the amount of data stored in the terminal is negligible, there is a low possibility that many transmission resources will be allocated to the terminal and a high MCS level will be applied to the terminal.

In an embodiment of the present invention that addresses the above scenario, the terminal generates and transmits power headroom information using the following two conditions:

Condition 1 A change in path loss exceeds A.
Condition 2 The amount of data stored in a terminal exceeds a data amount threshold ("Y").

In Condition 1, a change in power headroom or a change in Channel Quality Information (CQI) may be used instead of the change in path loss.

In Condition 1, a terminal may determine the change in power headroom by classifying power headrooms indicated by code points according to areas, and then applying different thresholds to the respective areas. The reason why the terminal uses the above method is as follows. If the power headroom is large, there is a low possibility that the base station will perform scheduling so that $P_{REQUIRED}$ exceeds $P_{MAX}$, since the changed power headroom still has a large value despite the significant change. However, if the power headroom is small, there is a high possibility that the base station will perform scheduling so that $P_{REQUIRED}$ exceeds $P_{MAX}$ despite an insignificant change in power headroom.

In the following description, it is assumed that the power headroom information consists of 8 bits and the power headroom indicated by each code point of the power headroom information is as shown in Table 1.

TABLE 1

| Power Headroom Information | Power Headroom | Area |
| --- | --- | --- |
| 0 | $X_0$ | Area 1 |
| ... | ... | ... |
| N-1 | $X_{(N-1)}$ | Area 1 |
| N | $X_N$ | Area 2 |
| ... | ... | ... |
| M-1 | $X_{(M-1)}$ | Area 2 |
| M | $X_M$ | Area 3 |
| ... | ... | ... |
| 255 | $X_{255}$ | Area 3 |

Referring to Table 1, the area between power headrooms $X_0$ and $X_{(N-1)}$ is defined as an area 1, the area between power headrooms $X_N$ and $X_{(M-1)}$ as an area 2, and the area between power headrooms $X_{(M-1)}$ and $X_{255}$ as an area 3.

Based on Table 1, if the last reported power headroom belongs to the area 1, a terminal according to an embodiment of the present invention determines that the power headroom has changed by a predetermined threshold or more, only when a difference between the current power headroom and the last reported power headroom is greater than or equal to $\Delta_1$. If the last reported power headroom belongs to the area 2, the terminal determines that the power headroom has changed by a predetermined threshold or more, only when a difference between the current power headroom and the last reported power headroom is greater than or equal to $\Delta_2$. If the last reported power headroom belongs to the area 3, the terminal determines that the power headroom has changed by a predetermined threshold or more, only when a difference between the current power headroom and the last reported power headroom is greater than or equal to $\Delta_3$.

Figure 2:
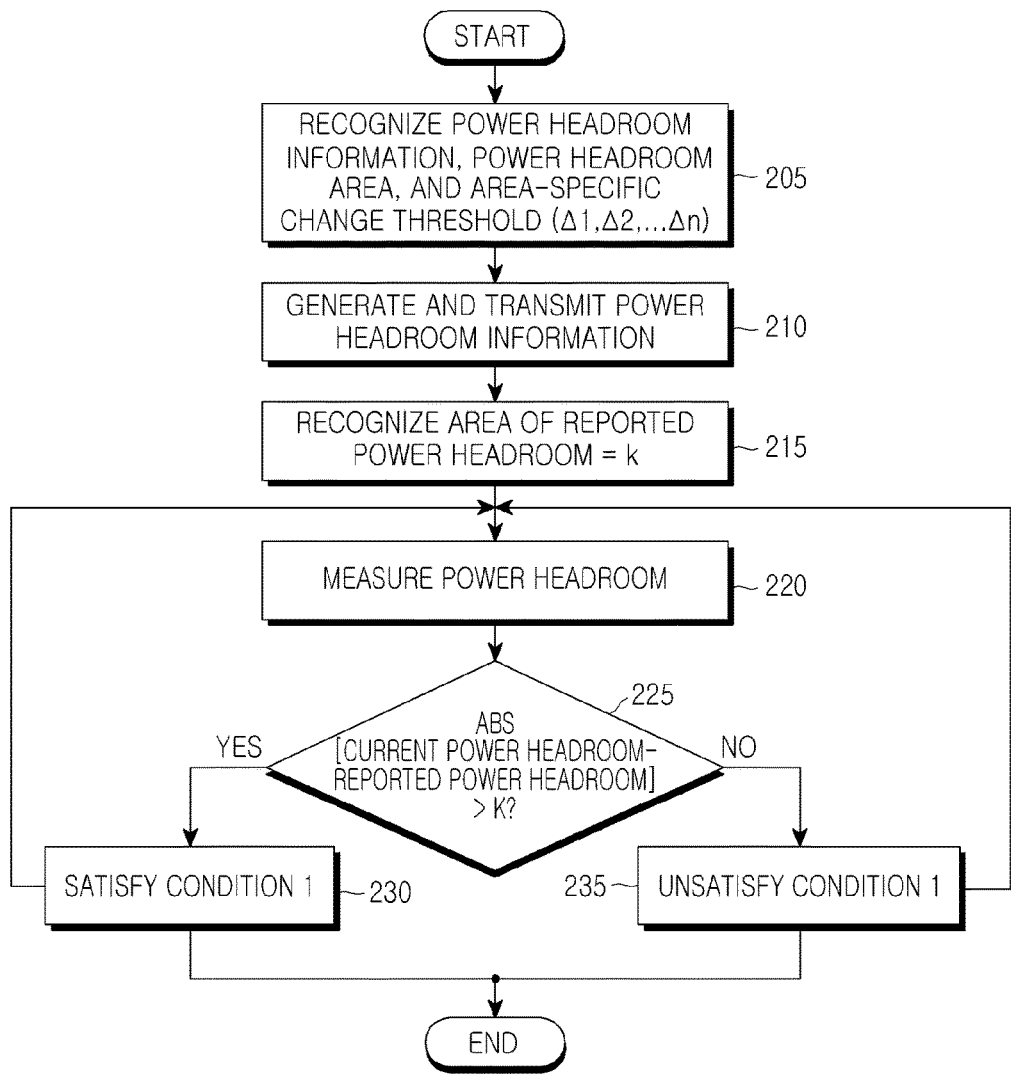
FIG. 2 is a flowchart showing an example of a method for determining the satisfaction/non-satisfaction of a first condition (Condition 1) for transmission of power headroom information in a terminal according to an embodiment of the present invention.

Namely, if the satisfaction/non-satisfaction of Condition 1 is determined depending on the change in power headroom, the terminal operates as specified in FIG. 2.

Referring to FIG. 2, in step 205, the terminal recognizes power headroom information, a power headroom area, and an area-specific change threshold through a call setup process. Recognizing power headroom information by the terminal in step 205 refers to recognizing a mapping relationship between code points of power headroom information and power headrooms. Recognizing a power headroom area by the terminal in step 205 refers to recognizing an area to which the power headroom belongs, for example, recognizing a certain area to which an arbitrary power headroom belongs, regarding all power headrooms between the power headroom mapped to the minimum value of the power headroom information and the power headroom mapped to the minimum value. Recognizing an area-specific change threshold by the terminal in step 205 refers to, if n power headroom areas have been defined, recognizing change thresholds Δ1, Δ2, . . . , Δn, defined for their associated n power headroom areas.

In step 210, the terminal generates and transmits power headroom information while performing the common uplink data transmission process. After successfully transmitting the power headroom information, the terminal checks an area to which the reported power headroom belongs, in the power headroom information in step 215. Here, the reported power headroom's area is defined as k.

In step 220, the terminal continuously measures the power headroom. In step 225, the terminal calculates a difference between the measured current power headroom and the reported power headroom, and checks if the difference is greater than a change threshold Δk of the area k. If the difference between the measured current power headroom and the reported power headroom is greater than the threshold Δk in step 225, the terminal determines in step 230 that Condition 1 is satisfied. If the terminal determines in step 230 that Condition 1 is satisfied, the terminal returns to step 220 and continues a necessary operation of generating the power headroom information, or may end the operation depending on the situation.

However, if the difference between the measured current power headroom and the reported power headroom is less than or equal to the threshold Δk in step 225, the terminal determines in step 235 that Condition 1 is unsatisfied. Having determined the non-satisfaction of Condition 1 in step 225, the terminal returns from step 235 to step 220 and continues to measure power headroom. In step 235, the terminal may terminate the operation depending on the situation.

The reason why the terminal uses Condition 2 in determining whether to generate power headroom information is as follows. If the amount of data stored in the terminal is small, the utility of the power headroom information also falls. Thus, the terminal need not generate and transmit the power headroom information if the amount of stored data is less than or equal to a predetermined threshold. As an extreme example, if the terminal has no data to transmit, utility value of the power headroom information does not exist. There is a property that the data amount threshold Y of Condition 2 is in inverse proportion to the frequency of occurrence of power headroom information. That is, as Y increases, the frequency of occurrence of power headroom information is reduced, and as Y is lower, the frequency of occurrence of power headroom information increases. The network may set a different value for Y according to the terminal characteristics or the cell conditions. For example, since it is likely that more transmission resources will be allocated to a terminal used by a premium user, a low data amount threshold Y may be set to the terminal so that power headroom information may be generated more frequently. On the other hand, in a high-cell load environment in which there is a low possibility that more transmission resources will be allocated to an arbitrary terminal, the frequency of occurrence of power headroom information may be reduced by increasing the data amount threshold Y.

Now, a description will be made of first to third embodiments of the present invention for generating and transmitting power headroom information using Condition 1 and Condition 2 described above.

First Embodiment

Figure 3:
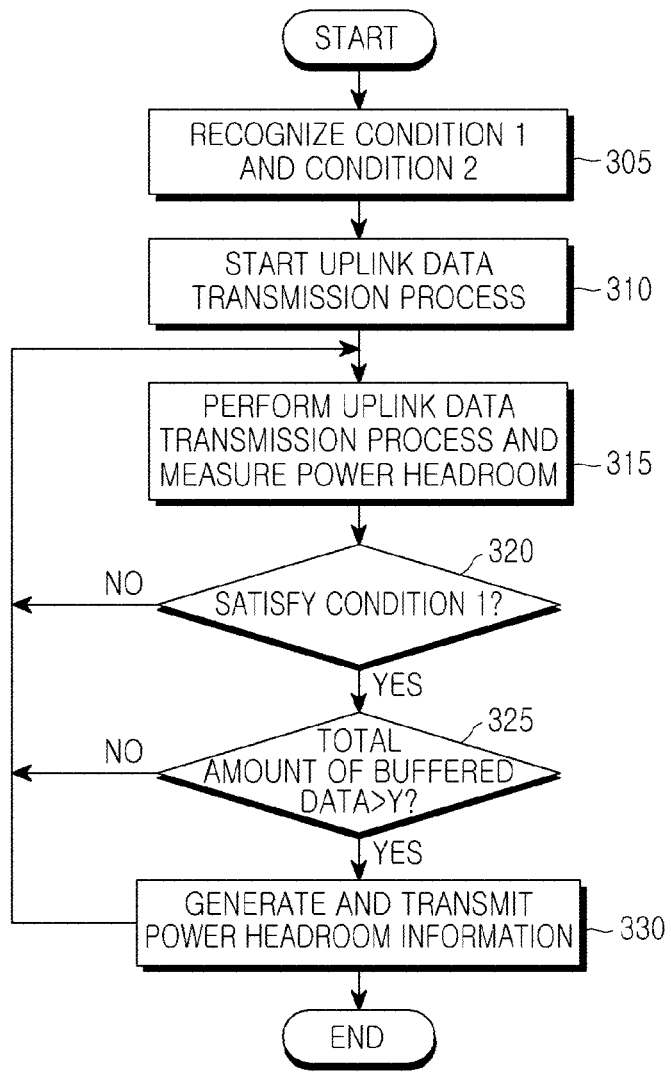
FIG. 3 is a flowchart showing a method for transmitting power headroom information in a terminal according to a first embodiment of the present invention.

Referring to FIG. 3, the terminal recognizes Condition 1 and Condition 2, which are power headroom information generation conditions, in step 305. Condition 1, as described above, is satisfied when a change in path loss is greater than or equal to a predetermined threshold, when a change in power headroom is greater than or equal to a predetermined area-specific threshold, or when a change in CQI is greater than or equal to a predetermined threshold.

In step 310, the terminal starts an uplink data transmission process according to a predetermined procedure. In step 315, the terminal measures its power headroom while performing uplink data transmission. That is, the terminal receives uplink scheduling information through a downlink control channel, and measures its path loss, power headroom, or downlink channel quality at intervals of a predetermined period, while transmitting uplink data according to the received scheduling information. The uplink scheduling information is information that indicates allocated transmission resources and an MCS level to be applied.

In step 320, the terminal determines whether Condition 1 is satisfied. That is, the terminal determines whether a difference between the current path loss measured at stated intervals and a path loss used to calculate power headroom of the power headroom information that has been last transmitted successfully exceeds a predetermined threshold indicated in Condition 1. The terminal may also determine whether a difference between the current power headroom measured at stated intervals and the power headroom that has been last reported successfully exceeds a predetermined threshold indicated in Condition 1. The predetermined threshold indicated in Condition 1 may be differently defined according to the area, and a threshold corresponding to an area to which the power headroom belongs, that has been last transmitted successfully, may be used, as described in FIG. 2. Also, the terminal may determine whether a difference between the current CQI that is measured at stated intervals and reflects the downlink channel quality, and the CQI used to calculate power headroom of the power headroom information that has been last reported successfully, exceeds a predetermined threshold indicated in Condition 1.

If it is determined in step 320 that Condition 1 is satisfied, the terminal proceeds to step 325. Otherwise, if Condition 1 is unsatisfied, the terminal returns to step 315 and performs uplink data transmission and power headroom measurement.

In step 325, the terminal checks whether Condition 2 is satisfied. That is, the terminal checks in step 325 whether the sum of uplink data stored at the present time exceeds predetermined Y indicated in Condition 2. If the sum of the stored data exceeds Y, the terminal proceeds to step 330 and otherwise proceeds to step 315. Depending on the terminal, Y may be set to zero (0). That is, it may be determined that Condition 2 is satisfied unless the terminal's buffer is empty. Subsequently, the terminal generates power headroom information and transmits the power headroom information to the base station according to a predetermined procedure in step 330, and then returns to step 315, or ends the operation.

Second Embodiment

In a second embodiment of the present invention, a terminal checks the satisfaction/non-satisfaction of Condition 1 and Condition 2 immediately before transmitting uplink data instead of constantly checking the satisfaction/non-satisfaction, so the terminal may transmit the power headroom information along with uplink transmission data, without requesting allocation of separate transmission resources despite the generation of the power headroom information. Use of the second embodiment of the present invention may ensure more efficient use of transmission resources because the terminal does not request separate transmission resources, for transmission of power headroom information.

Figure 4:
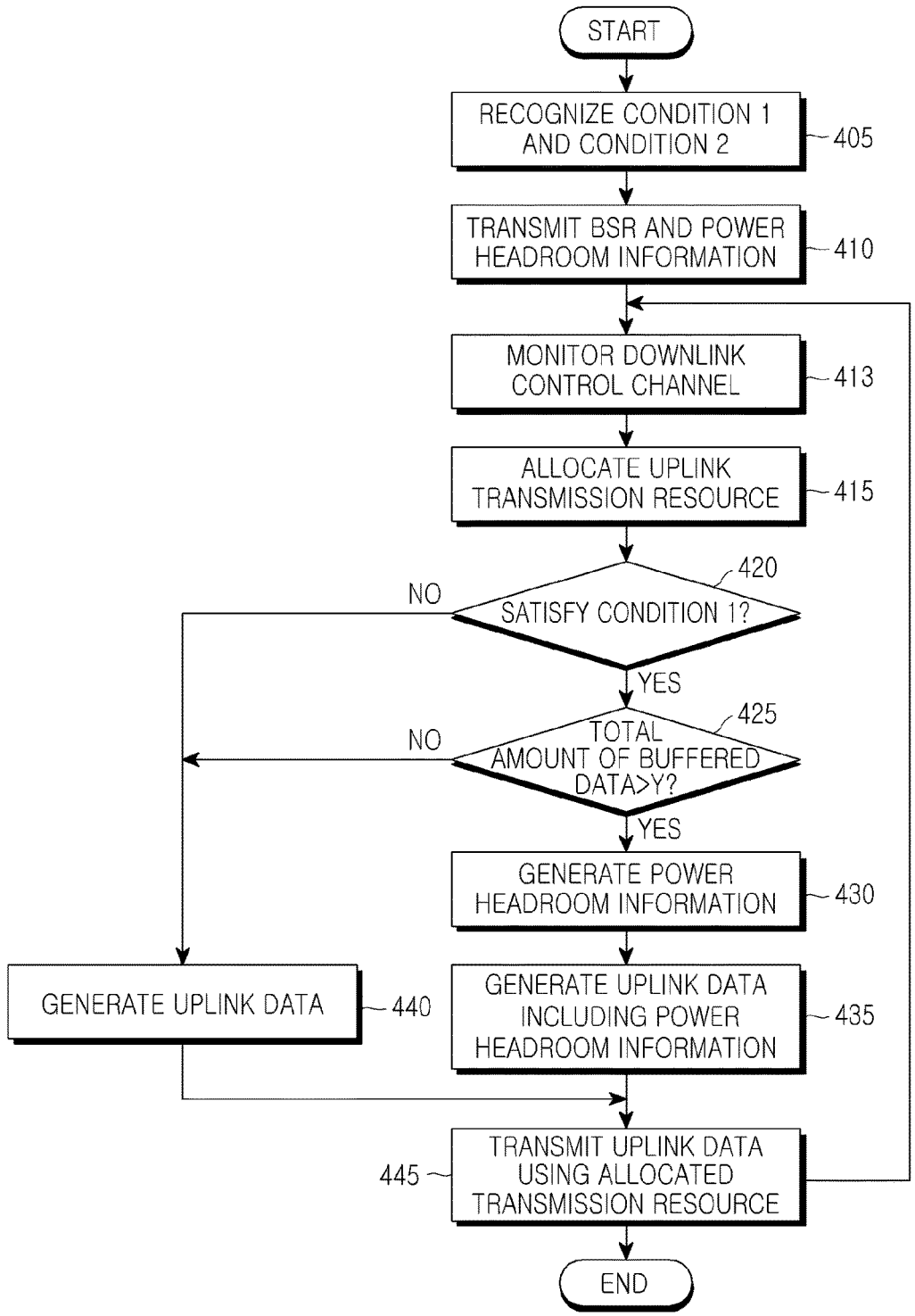
FIG. 4 is a flowchart showing a method for transmitting power headroom information in a terminal according to a second embodiment of the present invention.

Referring to FIG. 4, the terminal recognizes Condition 1 and Condition 2, which are power headroom information generation conditions, in step 405. Condition 1, as described above, is satisfied when a change in path loss is greater than or equal to a predetermined threshold when a change in power headroom is greater than or equal to a predetermined area-specific threshold, or when a change in CQI is greater than or equal to a predetermined threshold. Condition 2, as described above, is satisfied when the amount of data stored in the terminal is greater than or equal to a predetermined threshold. Having completed a call setup process, the terminal notifies the base station of the amount of its transmission data by transmitting a BSR according to a predetermined procedure in step 410. When a terminal with no transmission data reports the generation of new transmission data using the BSR, the terminal may transmit the power headroom information as well, while transmitting the BSR.

After successfully transmitting the BSR and the power headroom information in step 410, the terminal monitors a downlink control channel in step 413. While monitoring the downlink control channel, the terminal may measure the path loss or downlink channel status if necessary. Based on the measured downlink channel status, the terminal determines a Channel Quality Information (CQI) value it periodically transmits to the base station. While monitoring the downlink control channel in step 413, the terminal is allocated uplink transmission resources by receiving uplink scheduling information in step 415. Thereafter, the terminal determines in step 420 whether Condition 1 is satisfied. The process of determining whether Condition 1 is satisfied in step 420 is identical to step 320 described in the first embodiment, so a detailed description is omitted here.

If Condition 1 is satisfied in step 420, the terminal proceeds to step 425, and if Condition 1 is unsatisfied, the terminal proceeds to step 440. In step 425, the terminal checks whether Condition 2 is satisfied. Namely, the terminal determines in step 425 whether the sum of uplink data stored at the present time exceeds a predetermined data amount threshold Y indicated in Condition 2. If the sum of the stored data exceeds data amount threshold Y, the terminal proceeds to step 430, and otherwise, the terminal proceeds to step 440. The sum of uplink data stored in the terminal in step 425 is a value determined by subtracting the amount of data to be transmitted using the transmission resources allocated in step 415 from the total amount of data at the present time. For example, if the base station instructed in step 415 the terminal to transmit 500-byte data and the terminal has stored data of a total of 1000 bytes in step 425, then the terminal compares a value determined by subtracting 500 bytes from 1000 bytes with the data amount threshold Y.

In step 430, the terminal calculates power headroom using the current path loss, and generates power headroom information including the calculated power headroom. In step 435, the terminal generates uplink data with the power headroom information, and then proceeds to step 445. If either Condition 1 or Condition 2 is unsatisfied even though the terminal was allocated the uplink transmission resources in step 415, the terminal generates uplink data according to the common procedure in step 440 and then proceeds to step 445, because the terminal does not generate power headroom information. In step 445, the terminal transmits the uplink data generated in step 435 using the allocated transmission resources, and then returns to step 413 to monitor the downlink control channel, or ends its operation depending on the terminal's situation.

Third Embodiment

In the second embodiment of the present invention, Condition 2 is checked before power headroom information is generated. The reason for checking Condition 2 in the embodiment of the present invention is to determine the amount of data left in the terminal after data with the power headroom information was transmitted is greater than or equal to a predetermined threshold. Therefore, more accurate results may be obtained by checking Condition 2 after generating data with the power headroom information.

Accordingly, the third embodiment of the present invention provides a method in which if uplink transmission resources are allocated and Condition 1 is satisfied, the terminal generates data with power headroom information and then compares the amount of its remaining data with data amount threshold Y, to transmit the data with the power headroom information as it is, or to transmit new data in which the power headroom information is replaced by user data.

Figure 5:
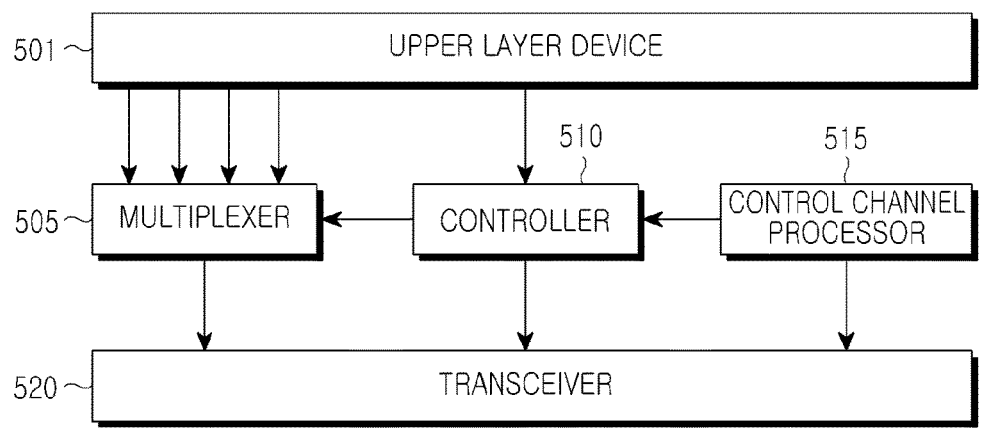
FIG. 5 is a flowchart showing a method for transmitting power headroom information in a terminal according to a third embodiment of the present invention.

Referring to FIG. 5, the terminal recognizes Condition 1 and Condition 2, which are power headroom information generation conditions, through a call setup process in step 505. Condition 1, as described above, is satisfied, for example, when a change in path loss is greater than or equal to a predetermined threshold. Condition 2, as described above, is satisfied when the amount of data stored in a terminal is greater than or equal to a predetermined threshold.

Having completed a call setup process, the terminal notifies the base station of the amount of its transmission data by transmitting a Buffer Status Report (BSR) according to a predetermined procedure in step 510. When the terminal with no transmission data reports the new generation of transmission data using the BSR, the terminal may transmit the power headroom information as well, while transmitting the BSR.

After successfully transmitting the BSR and the power headroom information in step 510, the terminal monitors the downlink control channel in step 513. While monitoring the downlink control channel, the terminal may measure the path loss or downlink channel status if necessary. Based on the measured downlink channel status, the terminal determines a CQI value it periodically transmits to the base station.

While monitoring the downlink control channel, the terminal is allocated uplink transmission resources by receiving uplink scheduling information in step 515. Thereafter, in step 520, the terminal measures power headroom for transmission of uplink data and determines whether Condition 1 is satisfied, based on the measured power headroom. The process of determining whether Condition 1 is satisfied in step 520 is identical to step 320 described in the first embodiment, so a detailed description is omitted here.

If Condition 1 is satisfied in step 520, the terminal proceeds to step 525, and otherwise, the terminal proceeds to step 540. In step 525, the terminal calculates power headroom using the current path loss, and generates power headroom information with the calculated power headroom. In step 530, the terminal generates uplink data with the power headroom information, and then determines in step 535 whether the sum of data left in the terminal's buffer is greater than or equal to data amount threshold Y. If the sum of the remaining data is greater than or equal to data amount threshold Y, the terminal proceeds to step 550, and if the sum of the remaining data is less than data amount threshold Y, the terminal proceeds to step 545. Proceeding to step 545 indicates that it is efficient to transmit user data instead of power headroom information because of the low utility of the power headroom information due to the small amount of the remaining data. In step 545, the terminal removes the power headroom information and generates new uplink data with the remaining data. In step 550, the terminal transmits the uplink data generated in the previous step using the allocated transmission resources. The terminal then returns to step 513 to monitor the downlink control channel, or ends its operation according to the terminal's situation. If Condition 1 is unsatisfied in step 520, the terminal generates uplink data according to the common procedure in step 540, and then proceeds to step 550.

Figure 6:
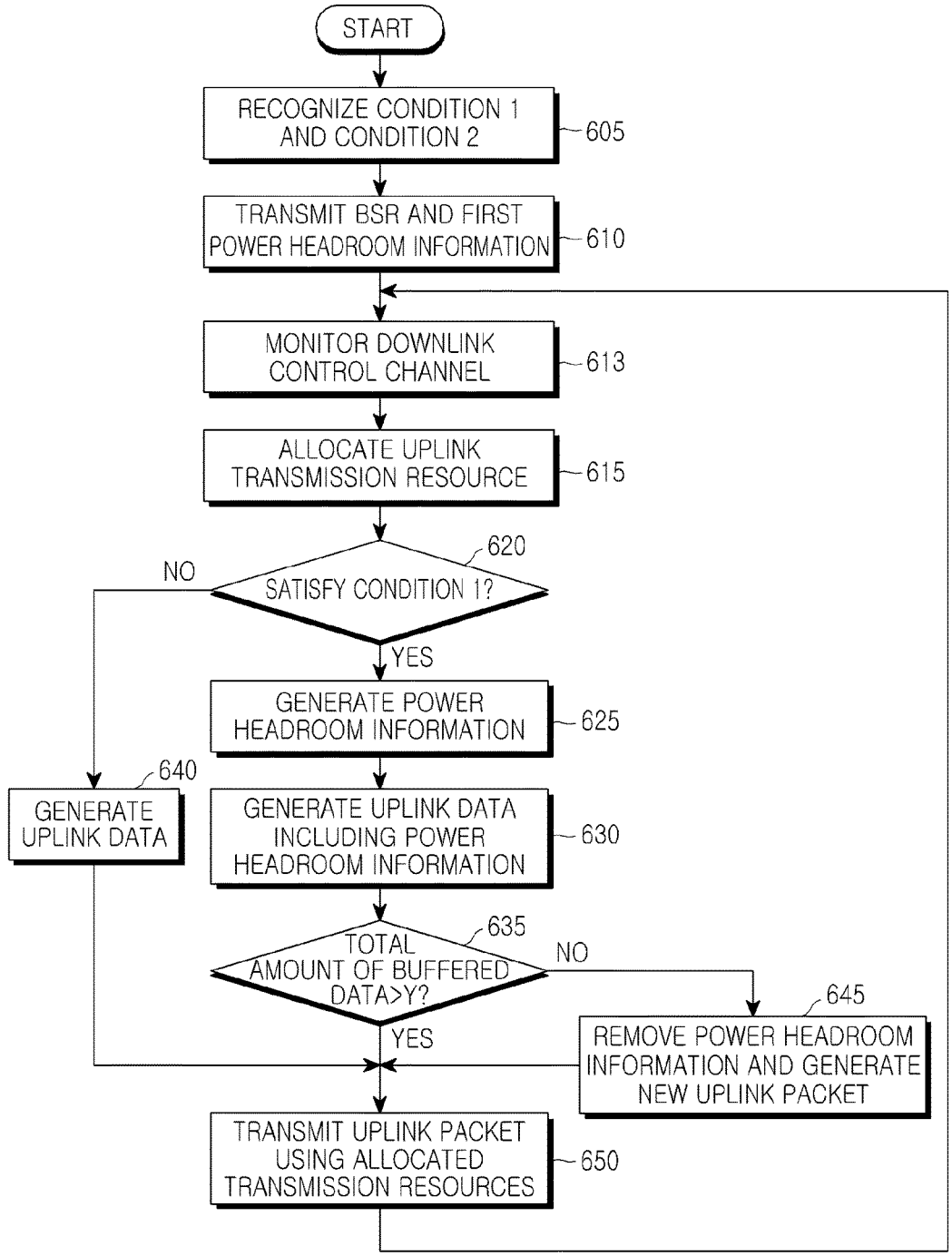
FIG. 6 is a block diagram of a terminal for transmitting power headroom information according to an embodiment of the present invention.

Referring to FIG. 6, a terminal according to the present invention includes an upper layer device 601, a multiplexer 605, a controller 610, a downlink control channel processor 615, and a transceiver 620.

The controller 610 is notified of Condition 1 and Condition 2 by the upper layer device 601 in charge of call setup. The controller 610 controls the transceiver 620 to measure uplink data and necessary control information. In other words, the controller 610 is adapted to measure at least one of power headroom, path loss, and downlink channel quality at stated intervals. Also, the controller 610 determines whether either Condition 1 or Condition 2 is satisfied. If so, the controller 610 generates appropriate power headroom information and provides it to the multiplexer 605. According to the first embodiment, the controller 610 generates power headroom information based on power headroom measured for uplink data transmission during transmission of uplink data if both of Condition 1 and Condition 2 are satisfied. According to the second embodiment, upon receiving a notification indicating the allocation of uplink transmission resources from the control channel processor 615, the controller 610 generates power headroom information if both of Condition 1 and Condition 2 are satisfied. According to the third embodiment, upon receiving a notification indicating the allocation of uplink transmission resources from the control channel processor 615, the controller 610 generates power headroom information if Condition 1 is satisfied, and then determines whether Condition 2 is satisfied.

The multiplexer 605 multiplexes the uplink data provided from the upper layer with the power headroom information generated by the controller 610. In other words, the multiplexer 605 generates uplink data including the power headroom information generated by the controller 610.

The transceiver 620 transmits/receives the uplink data or control information through wireless channels.

The control channel processor 615 monitors the downlink control channel (e.g., a channel carrying allocation information for uplink transmission resources) the transceiver 620 has received, and if uplink transmission resources are allocated, the downlink control channel processor 615 notifies the controller 610 of the allocated uplink transmission resources.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for transmitting power headroom information by a terminal in a mobile communication system, the method comprising:
   receiving, by the terminal, information on an allocated uplink transmission resource;
   determining whether a path loss has changed more than a threshold, after transmitting last power headroom information, when the terminal has the allocated uplink transmission resource;
   if the path loss has changed more than the threshold when the terminal has the allocated uplink transmission resource, determining a transmission of the power headroom information; and
   transmitting an uplink packet including the power headroom information using the allocated uplink transmission resource.

2. The method of claim 1, wherein the power headroom information is obtained from a difference of a maximum transmission output of the terminal and a transmission power of the terminal.

3. The method of claim 2, wherein the transmission power of the terminal is obtained using the path loss and information related to a Modulation Coding Scheme (MCS).

4. The method of claim 2, further comprising receiving information of the maximum transmission output of the terminal from a base station.

5. The method of claim 1, wherein the uplink packet is generated by multiplexing uplink data provided from an upper layer with the power headroom information.

6. A terminal apparatus for transmitting power headroom information in a mobile communication system, the terminal apparatus comprising:
   a controller configured to
      determine whether a path loss has changed more than a threshold, after transmitting last power headroom information, when the terminal has an allocated uplink transmission resource, and
      if the path loss has changed more than the threshold when the terminal has the allocated uplink transmission resource, determine a transmission of the power headroom information; and
   a transceiver configured to receive information on the allocated uplink transmission resource, and transmit an uplink packet including the power headroom information using the allocated uplink transmission resource.

7. The terminal apparatus of claim 6, wherein the controller is further configured to obtain the power headroom information from a difference of a maximum transmission output of the terminal apparatus and a transmission power of the terminal apparatus.

8. The terminal apparatus of claim 7, wherein the controller is further configured to obtain the transmission power of the terminal apparatus using the path loss and information related to a Modulation Coding Scheme (MCS).

9. The terminal apparatus of claim 7, wherein the transceiver is further configured to receive information of the maximum transmission output of the terminal apparatus from a base station.

10. The terminal apparatus of claim 6, wherein the controller is further configured to generate the uplink packet by multiplexing uplink data provided from an upper layer with the power headroom information.

11. A method for receiving power headroom information by a base station in a mobile communication system, the method comprising:
   transmitting, by the base station, information on an allocated uplink transmission resource to a terminal; and
   receiving, by the base station, an uplink packet including the power headroom information from the terminal using the allocated uplink transmission resource,
   wherein the uplink packet including the power headroom information is transmitted from the terminal by:
   determining whether a path loss has changed more than a threshold, after transmitting last power headroom information, when the terminal has the allocated uplink transmission resource;
   if the path loss has changed more than the threshold when the terminal has the allocated uplink transmission resource, determining a transmission of the power headroom information; and
   transmitting the uplink packet including the power headroom information using the allocated uplink transmission resource.

12. The method of claim 11, wherein the power headroom information is obtained from a difference of a maximum transmission output of the terminal and a transmission power of the terminal.

13. The method of claim 12, wherein the transmission power of the terminal is obtained using the path loss and information related to a Modulation Coding Scheme (MCS).

14. The method of claim 12, further comprising transmitting information of the maximum transmission output of the terminal to the terminal.

15. The method of claim 11, wherein the terminal generates the uplink packet by multiplexing uplink data provided from an upper layer with the power headroom information.

16. A base station apparatus for receiving power headroom information in a mobile communication system, the base station apparatus comprising:
   a transceiver configured to transmit information on an allocated uplink transmission resource to a terminal, and receive an uplink packet including the power headroom information from the terminal using the allocated uplink transmission resource; and
   a controller configured to allocate an uplink transmission resource to the terminal based on the received power headroom information,
   wherein the uplink packet including the power headroom information is transmitted from the terminal by:
   determining whether a path loss has changed more than a threshold after transmitting last power headroom information when the terminal has the allocated uplink transmission resource;
   if the path loss is changed more than the threshold when the terminal has the allocated transmission resource, determining a transmission of the power headroom information; and
   transmitting the uplink packet including the power headroom information using the allocated uplink transmission resource.

17. The base station apparatus of claim 16, wherein the power headroom information is obtained from a difference of a maximum transmission output of the terminal and a transmission power of the terminal.

18. The base station apparatus of claim 17, wherein the transmission power of the terminal is obtained using the path loss and information related to a Modulation Coding Scheme (MCS).

19. The base station apparatus of claim 17, wherein the transceiver is further configured to transmit information of the maximum transmission output of the terminal to the terminal.

20. The base station apparatus of claim 16, wherein the terminal generates the uplink packet by multiplexing uplink data provided from an upper layer with the power headroom information.

* * * * *

UNITED STATES PATENT AND TRADEMARK OFFICE
CERTIFICATE OF CORRECTION

Page 1 of 1

PATENT NO. : 10,070,394 B2
APPLICATION NO. : 15/290336
DATED : September 4, 2018
INVENTOR(S) : Soeng-Hun Kim et al.

It is certified that error appears in the above-identified patent and that said Letters Patent is hereby corrected as shown below:

(63) Related U.S. Application Data:
"Continuation of application No. 14/285,206, filed on May 22, 2014, now Pat. No. 9,467,952, which is a continuation-in-part of application No. 12/812,484, filed as application No. PCT/KR2009/000091 on Jan. 8, 2009, now Pat. No. 8,768,399."

Should be:
-- Continuation of application No. 14/285,206, filed on May 22, 2014, now Pat. No. 9,467,952, which is a continuation of application No. 12/812,484, filed as application No. PCT/KR2009/000091 on Jan. 8, 2009, now Pat. No. 8,768,399. --

Signed and Sealed this
Twenty-sixth Day of February, 2019

Andrei Iancu
*Director of the United States Patent and Trademark Office*